United States Patent
Jiang et al.

(10) Patent No.: US 9,147,169 B2
(45) Date of Patent: Sep. 29, 2015

(54) METHOD AND DEVICE FOR LEARNING OF A CLASSIFIER, AND PROCESSING APPARATUS

(71) Applicant: CANON KABUSHIKI KAISHA, Tokyo (JP)

(72) Inventors: Yong Jiang, Beijing (CN); Long Jiang, Beijing (CN); Lifeng Xu, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 13/779,447

(22) Filed: Feb. 27, 2013

(65) Prior Publication Data

US 2013/0223727 A1    Aug. 29, 2013

(30) Foreign Application Priority Data

Feb. 29, 2012    (CN) .......................... 2012 1 0049537

(51) Int. Cl.
*G06K 9/62* (2006.01)
*G06N 99/00* (2010.01)

(52) U.S. Cl.
CPC ............ *G06N 99/005* (2013.01); *G06K 9/6217* (2013.01); *G06K 9/6267* (2013.01); *G06K 9/6285* (2013.01)

(58) Field of Classification Search
CPC . G06K 9/6257; G06K 9/6217; G06K 9/6262; G06K 9/6267; G06K 9/6285; G06K 9/6256; G06K 9/6287; G06K 9/66
USPC ........................................................ 382/159
See application file for complete search history.

(56) References Cited

U.S. PATENT DOCUMENTS

2006/0165258 A1 *   7/2006   Avidan .......................... 382/103

FOREIGN PATENT DOCUMENTS

EP          1968013      *   2/2008
JP     2010-231768 A       10/2010

OTHER PUBLICATIONS (Marti, Hearst, "Support Vector Machines", Jul. 1998, IEEE Intelligent Systems).*
(Shigeo Abe, "Support Vector Machines for Pattern Classification-Chapter 4", Jan. 2010, Springer). http://download.springer.com/static/pdf/808/bok%253A978-1-84996-098-4.pdf?auth66=1416440963_613c54a729fa266db6eb799aee66c05d&ext=.pdf.*
Hiroshi Okada, et al; "A Note on Improvement of Classification Performance Based on SVDD Including Target Object Detection Scheme;" Graduate School of Information Science and Technology, Hokkaido University, Japan, Feb. 14, 2011; vol. 110, No. 420; pp. 113-117.
Tom Mitchell; "Combining Labeled and Unlabeled Data with Co-Training;" School of Computer Science, Carnegie Mellon University; Jul. 26, 1998; pp. 92-100.

(Continued)

*Primary Examiner* — Samir Ahmed
*Assistant Examiner* — Totam Le
(74) *Attorney, Agent, or Firm* — Canon USA, Inc. IP Division

(57) ABSTRACT

Unlabeled samples are added to existing samples. Candidate samples for new support vectors are extracted from the added unlabeled samples using a plurality of existing support vectors. The new support vectors are selected from the candidate samples using the plurality of existing support vectors.

14 Claims, 15 Drawing Sheets

(56) References Cited

OTHER PUBLICATIONS

Mary M. Moya, et al., "Network Constraints and Multi-Objective Optimization for One-Class Classification," Neural Networks, vol. 9, No. (3), pp. 463-474. doi: 10.1016/0893-6080(95)00120-4, 1996.

David M.J. Tax et al., "Support Vector Domain Description," Pattern Recognition Letters, vol. 20, pp. 1191-1199, Nov. 1999.

David M.J. Tax et al., "Online SVM Learning: From Classification to Data Description and Back," In C. et al. Molina, editor, Proc. NNSP, 2003, pp. 499-508.

Xiaopeng Hua et al., "Incremental Learning Algorithm for Support Vector Data Description," Journal of Software, vol. 6, No. 7, pp. 1166-1173, Jul. 2011.

* cited by examiner

METHOD AND DEVICE FOR LEARNING OF A CLASSIFIER, AND PROCESSING APPARATUS

BACKGROUND OF THE INVENTION

1. Field of the Invention

The present invention relates to machine learning and pattern recognition, and in particular, relates to a method and a device for learning of a classifier.

2. Description of the Related Art

In the field of object detection and tracking, a one-class classification method was extensively employed in last few decades. As described in Moya, M. and Hush, D. (1996). "Network constraints and multi-objective optimization for one-class classification". Neural Networks, 9(3):463-474. doi: 10.1016/0893-6080(95)00120-4, in the one-class classification method, it tries to distinguish one class of objects from all other possible objects, by learning from a training set containing only the objects of that class.

The support vector data description (SVDD) method is a powerful kernel method for the one-class classification. As described in D. Tax and R. Duin, "Support vector domain description". Pattern Recognit. Lett., vol. 20, pp. 1191-1199, November, 1999, the SVDD method aims at finding a minimum-volume sphere (also referred to as a minimum sphere), such that all or most of the target training samples are enclosed by the sphere. FIG. 1 shows a schematic diagram of the SVDD method. The points on the minimum sphere are referred to as support vectors, which characterize the minimum sphere for enclosing the training samples.

Because of the good learning capacity and the generalization performance of the SVDD method, success of SVDD has recently been shown in various applications. The performance and the accuracy of the SVDD method rely on the availability of a representative dataset of training samples. However, in some online applications such as video surveillance and image retrieval, the SVDD method may fail because there are not enough training samples in the initial state.

In order to address above issues, online learning techniques are introduced to the art. In the online learning techniques, a classifier is learned by one or few sample(s) firstly, and then updated along with the procedure of system executing. The online learning techniques achieve a great success because of the excellent adaptivity thereof and the limited memory requirement thereof. An Online SVDD method and an Incremental SVDD method are the techniques which are widely used in real-time object detection currently, both of which are the online learning methods based on the support vector methods.

In D. M. J. Tax and P. Laskov, "Online SVM learning: from classification to data description and back," In C. et al. Molina, editor, Proc. NNSP, 2003, pp. 499-508, the Online SVDD method is described. FIG. 2A shows a simplified flowchart of the Online SVDD method. Firstly, an original classifier based on SVDD and newly added labeled samples (i.e. positive samples) are obtained. The so-called positive samples are the samples which have been determine to belong to a target category. Then, the relatedness of every sample is calculated with the classifier. Next, the most irrelevant samples are selected from the previously training sample set for the original classifier. Then, new samples are added and the most irrelevant samples are removed based on the newly added positive samples. Lastly, the classifier is relearned using remained samples and new added samples.

FIG. 2B shows a schematic diagram of the Online SVDD method. As shown in FIG. 2B, in the updating process of the classifier, the samples in the original sample set are replaced by the newly added samples, and the hypersphere of the classifier is increasingly enlarged in the updating process.

In Xiaopeng Hua, Shifei Ding, "Incremental Learning Algorithm for Support Vector Data Description", JOURNAL OF SOFTWARE, VOL. 6, NO. 7, July 2011, the Incremental SVDD method is described, in which the SVDD incremental learning is performed by analyzing the possible changes of support vector set (SVs) after new samples are added to training sample set. FIG. 3A shows a simplified flowchart of the Incremental SVDD method. Firstly, an original classifier based on SVDD and newly added labeled samples are obtained. Then the previously training set is partitioned into support vector set and non support vector set. Next, whether there are new added samples outside the hypersphere of the original classifier is verified; if there are, these samples will be added into training sample set. Then, the samples which are most likely to be new support vectors are found in the non support vector set. Lastly, the classifier is relearned using the samples outside the hypersphere of the original classifier, the samples which are most likely to be new support vectors in the non support vector set and the support vector set.

FIG. 3B shows a schematic diagram of the Incremental SVDD method. As shown in FIG. 3B, in the updating process of the classifier, the classifier is updated based on the samples outside the hypersphere of the original classifier, the samples which are most likely to be new support vectors in the non support vector set and the original support vector set, and the hypersphere of the classifier is increasingly enlarged in the updating process.

As can be learned from FIGS. 2B and 3B, when the diversity of training samples is small, the learned hypersphere is small, that is, when the classifier is trained by a small set of training samples, the threshold of the learned classifier is small. When the diversity of training samples is enlarged, the learned hypersphere is enlarged too, that is, when the new samples are added, the threshold of learned classifier is increased.

That is, the hypersphere will be enlarged when the number of training samples increases, so the performance of learned classifier will be unstable. In addition, if some newly added samples are falsely labeled (it always happens in determination by classifier automatically), the performance of the learned classifier will become worse and worse. So the Online SVDD method and the Incremental SVDD method require the samples being labeled correctly (as positive or negative) in advance, in order to keep the classifier's performance to be stable over long running time.

Accordingly, there is a need for a novel technique to address any problem in the prior art.

SUMMARY OF THE INVENTION

In the present invention, a novel method and device for learning of a classifier are provided, with which the above problems are solved successfully.

According to one aspect of the present invention, a method for learning of a classifier using a plurality of samples is provided, the method comprising: an addition step for adding unlabeled samples to existing samples; an extraction step for extracting candidate samples from the added unlabeled samples using a plurality of existing support vectors; and a selection step for selecting the new support vectors from the candidate samples using the plurality of existing support vectors.

An advantage of the present invention is in that, with the present invention, the problem that the classifier's performance is unstable can be solved, and the fast calculation can be achieved.

Another advantage of the present invention is in that, with the present invention, the performance of the learned classifier can be improved by adding unlabeled samples continually. With the present invention, it not only guarantees the learning accuracy but also reduces space and time complexities.

Still another advantage of the present invention is in that, with the present invention, the reject rate (false alarm rate) can be controlled at a stable low level, and the classifier is kept away from over-training.

In addition, with the present invention, the classifier can be learned and updated rapidly, so it can become a solution for tracking in digital products.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which constitute a part of the specification, illustrate embodiments of the invention and, together with the description, serve to explain the principles of the invention.

The present invention will be better understood according the following detailed description with reference of the accompanying drawings.

FIGS. 2A and 2B are schematic diagrams showing the Online SVDD method in the prior art, in which FIG. 2A is a schematic flowchart thereof, and FIG. 2B is a schematic principle diagram thereof.

FIGS. 3A and 3B are schematic diagrams showing the Incremental SVDD method in the prior art, in which FIG. 3A is a schematic flowchart thereof, and FIG. 3B is a schematic principle diagram thereof.

$f_{max}$ in calculating the distances from any samples to the center of the support vectors according to embodiments of the present invention.

Figure 8:
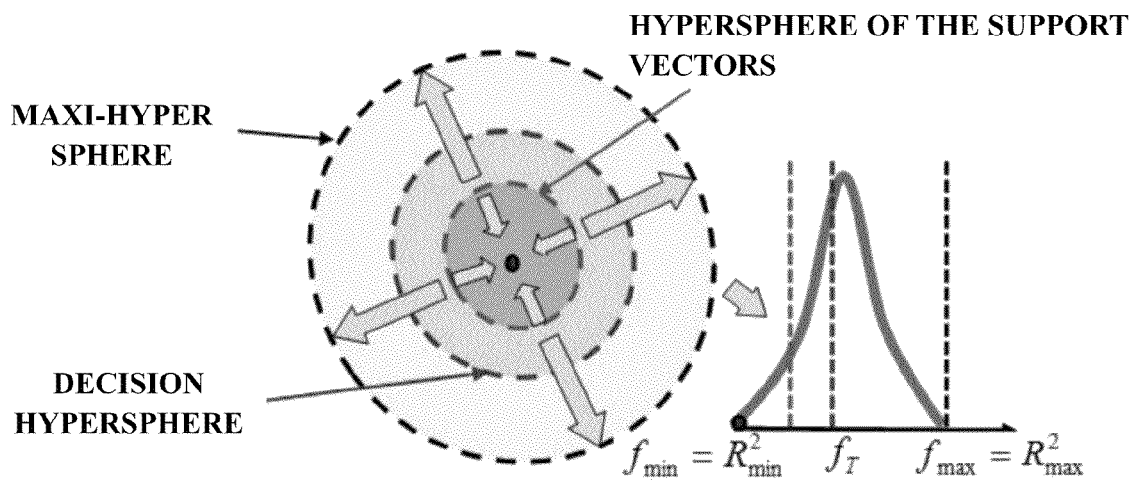

FIG. 8 shows a principle diagram for setting the threshold according to embodiments of the present invention.

Figure 9:
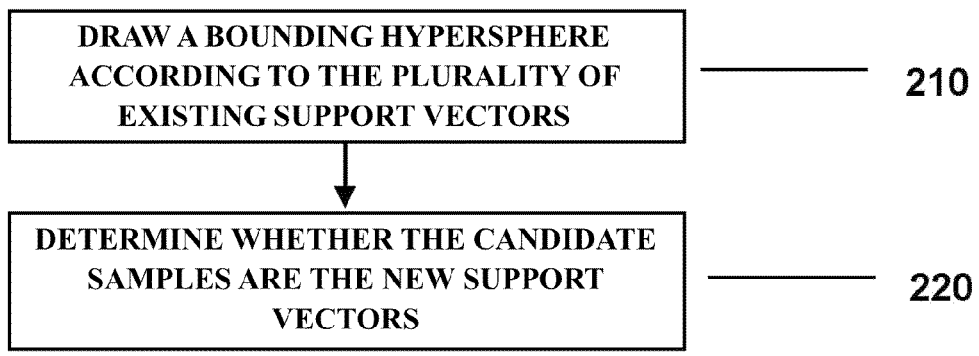

FIG. 9 shows a detailed flowchart of the process for selecting new support vectors according to embodiments of the present invention.

Figure 10:
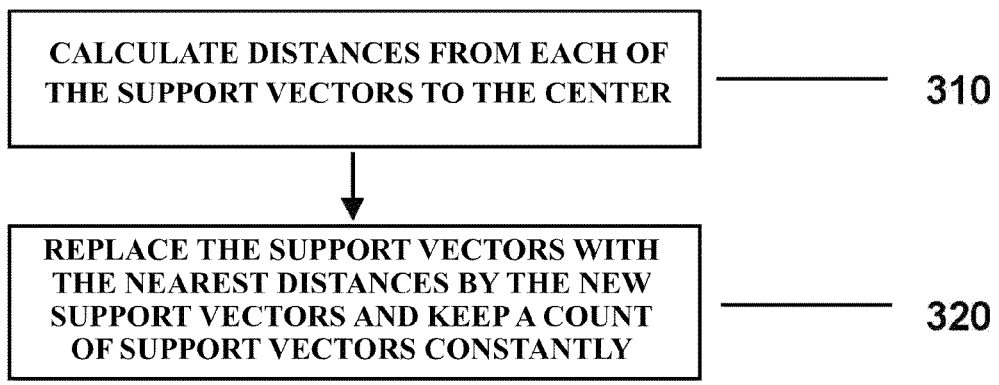

FIG. 10 shows a detailed flowchart of the process for updating the support vectors according to embodiments of the present invention.

Figure 11:
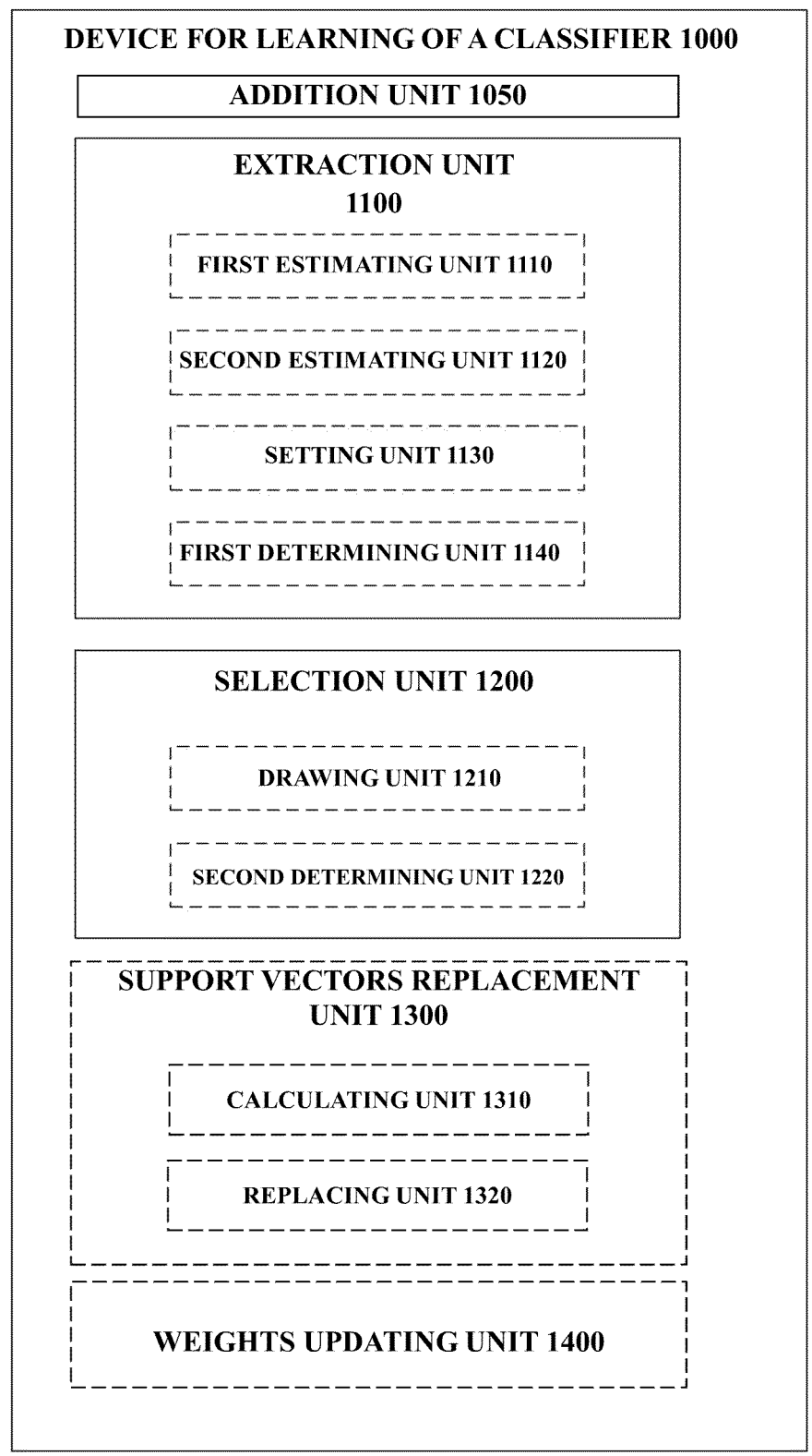

FIG. 11 shows a functional block diagram of the device for learning of a classifier according to embodiments of the present invention.

Figure 12:
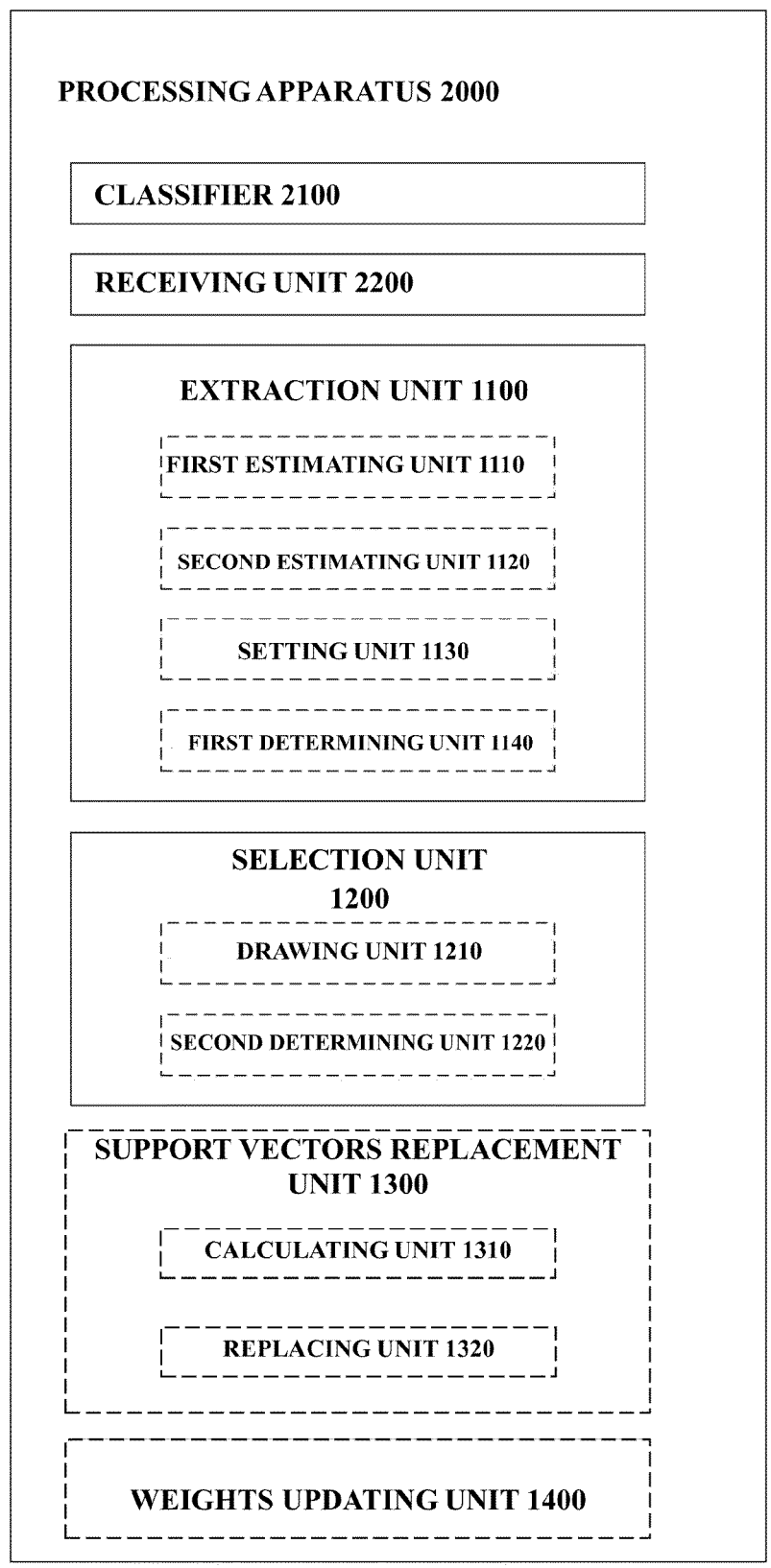

FIG. 12 shows a functional block diagram of the processing apparatus according to embodiments of the present invention.

Figure 13:
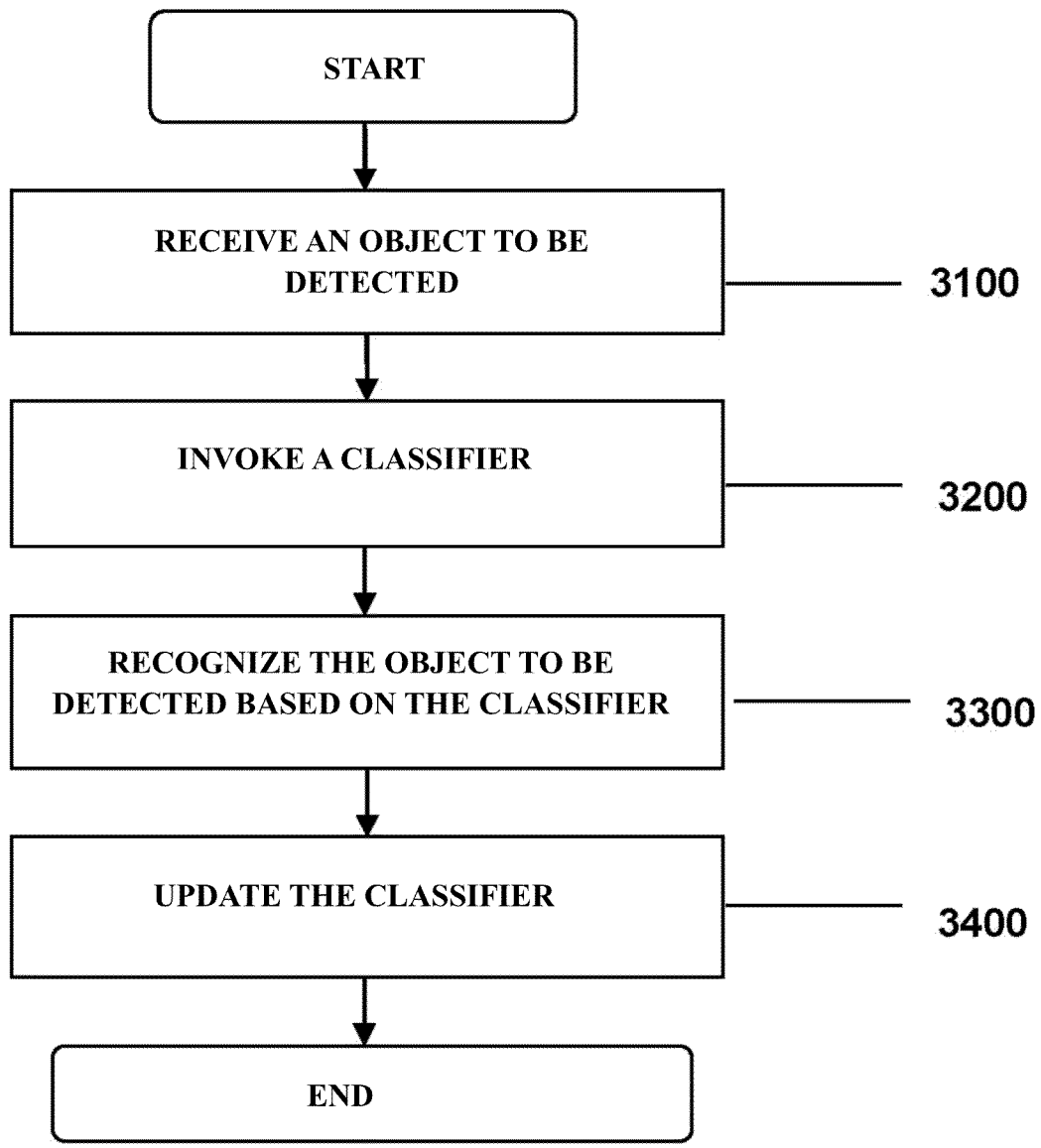

FIG. 13 shows a flowchart of the user registered object detection method according to embodiments of the present invention.

Figure 14:
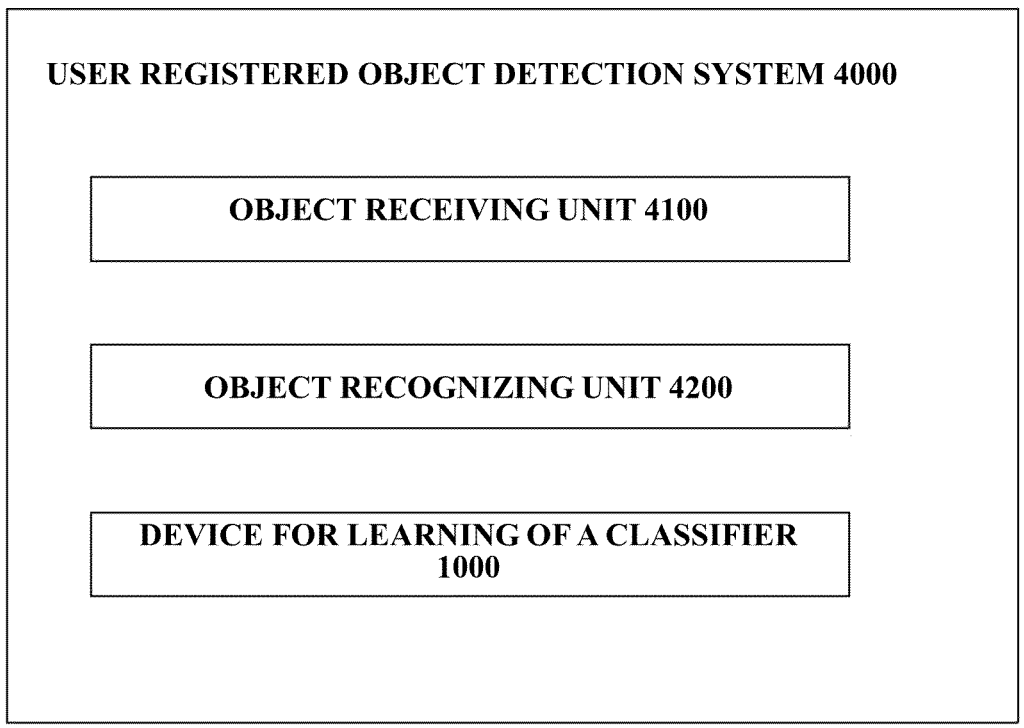

FIG. 14 shows a functional block diagram of the user registered object detection system according to embodiments of the present invention.

Figure 15:
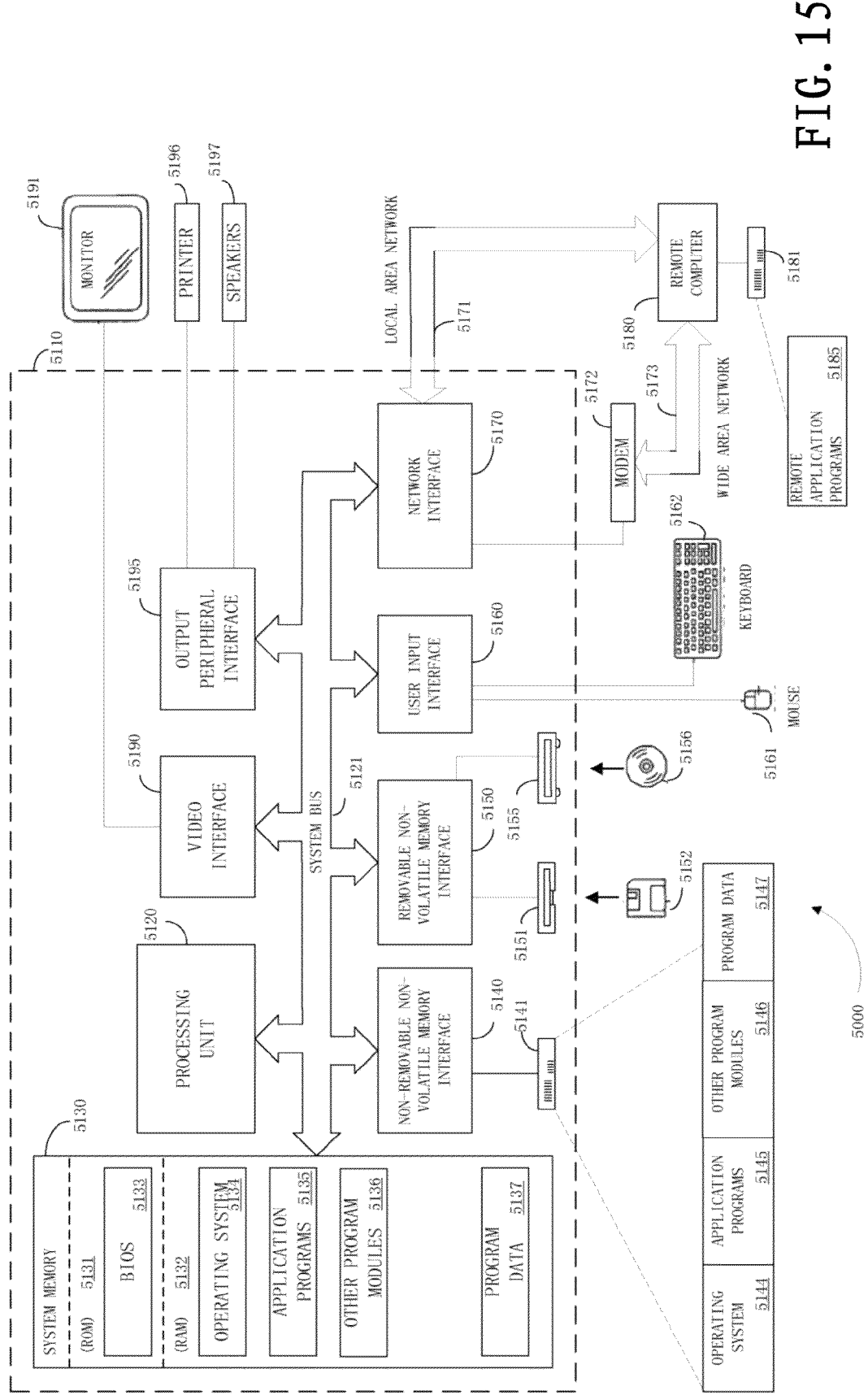

FIG. 15 shows a block diagram of the hardware configuration of the computer system according to embodiments of the present invention.

Figure 16A:
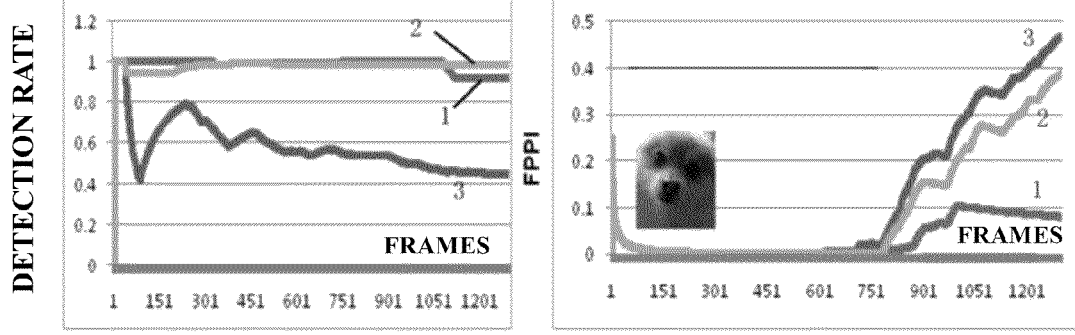
Figure 16B:
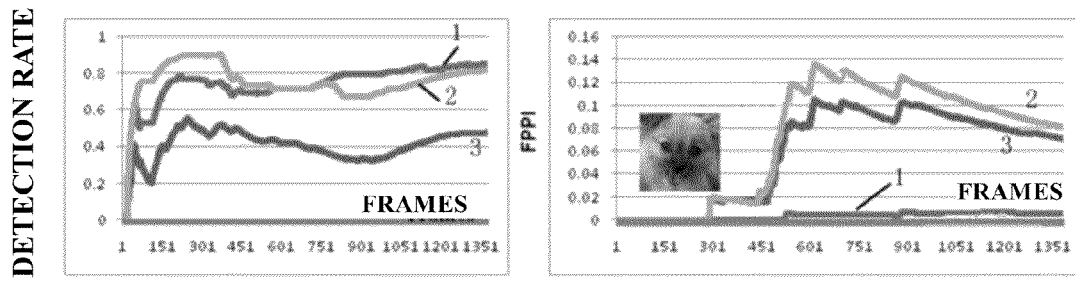
Figure 16C:
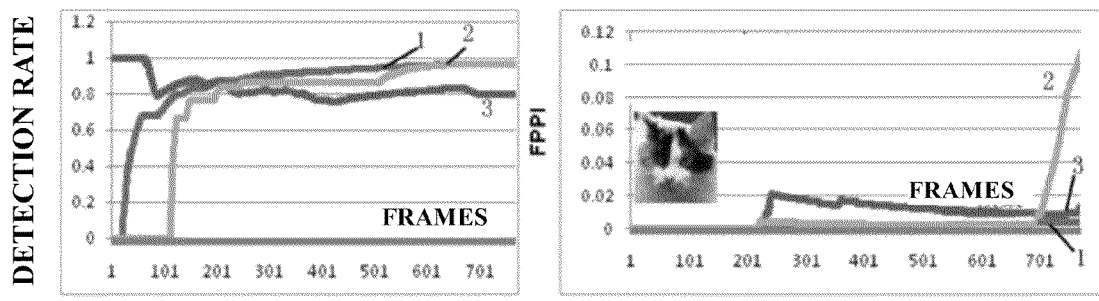

FIGS. 16A, 16B, and 16C show comparison graphs of the detection rate and the FPPI for three videos with regard to the method according to embodiments of the present invention, the Online SVDD method and the Incremental SVDD method.

Figure 17:
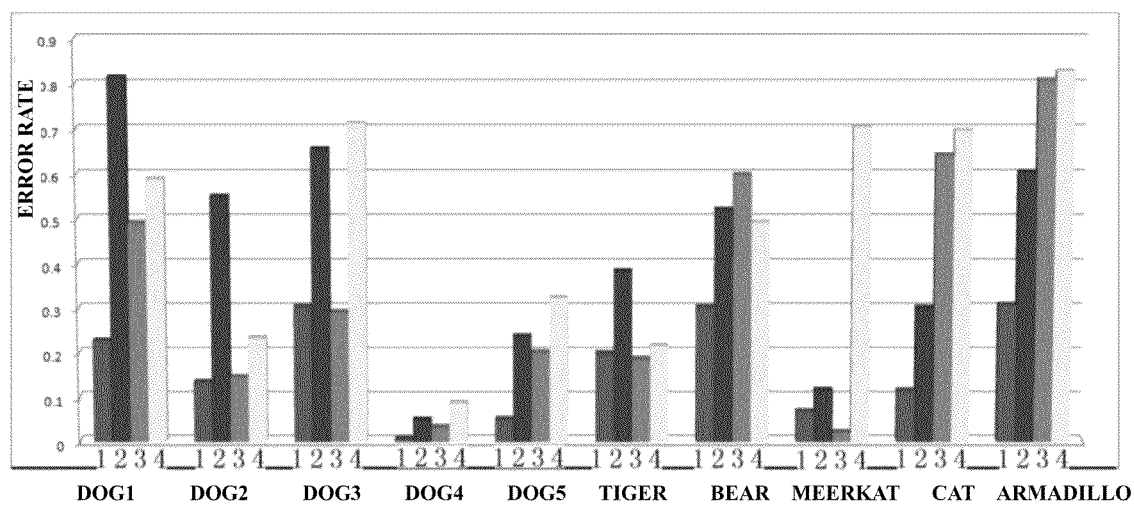
Figure 18A:
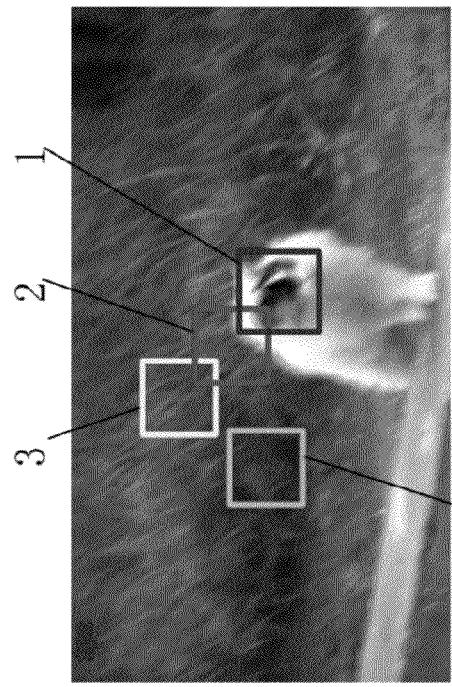
Figure 18B:
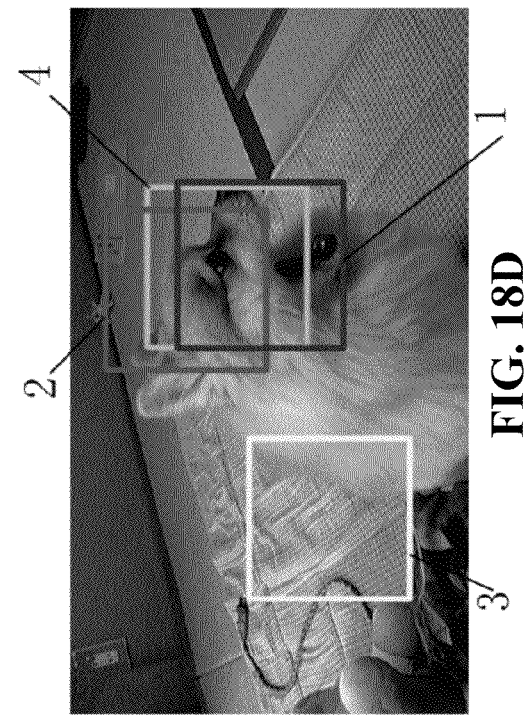
Figure 18C:
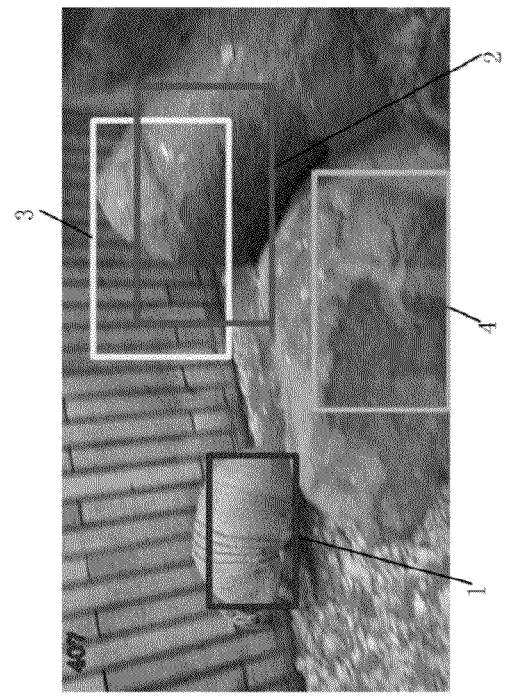
Figure 18D:
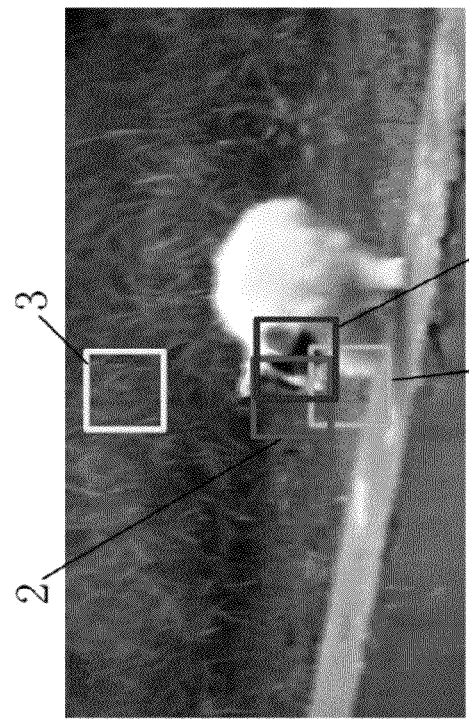

FIG. 17 shows a graph of the average error rate in the tracking application with regard to the method according to embodiments of the present invention and other three methods in prior art.

FIGS. 18A, 18B, 18C, and 18D show the illustrative results in the tracking application with regard to the method according to embodiments of the present invention and other three methods in prior art.

DESCRIPTION OF THE EMBODIMENTS

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

The present invention aims at providing a method for learning of a classifier. Differing from the methods in the prior art, the present invention directs to the unlabeled samples, i.e., the samples which have not been determined as positive samples.

Figure 1:
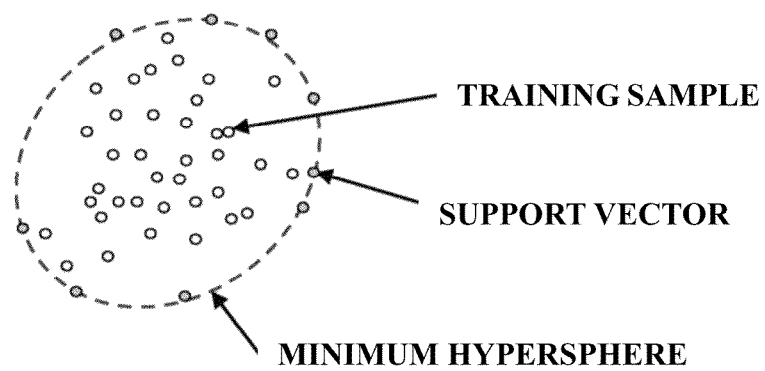
FIG. 1 is a schematic diagram showing the SVDD method in the prior art.
Figure 2A:
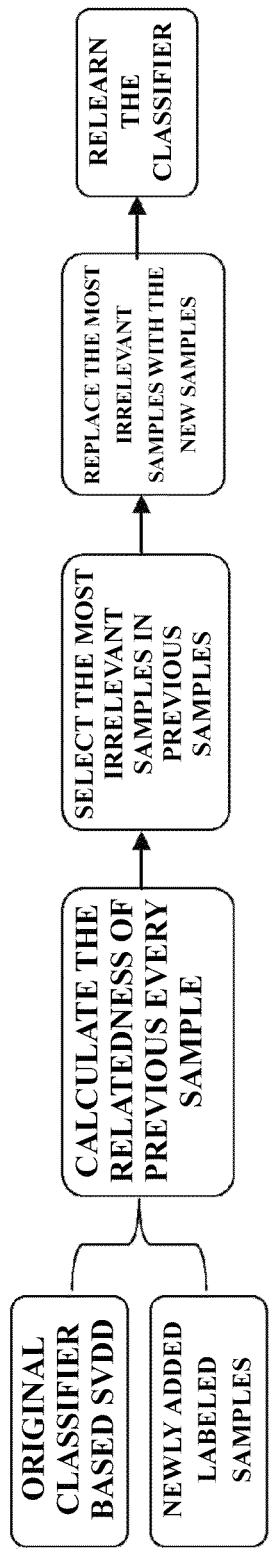
Figure 2B:
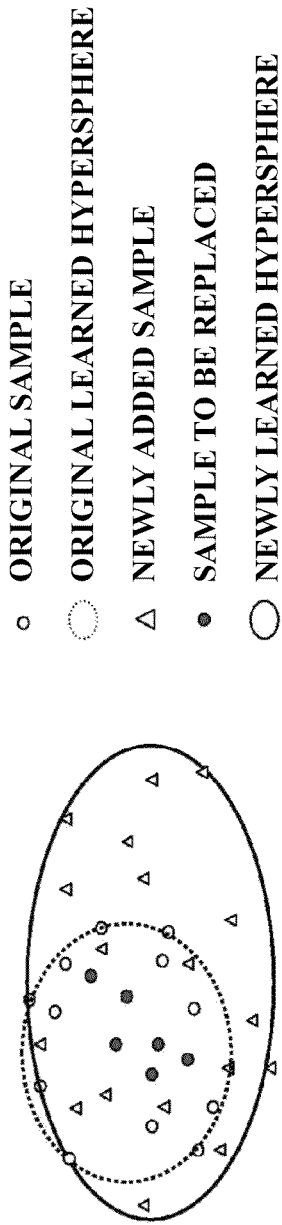
Figure 3A:
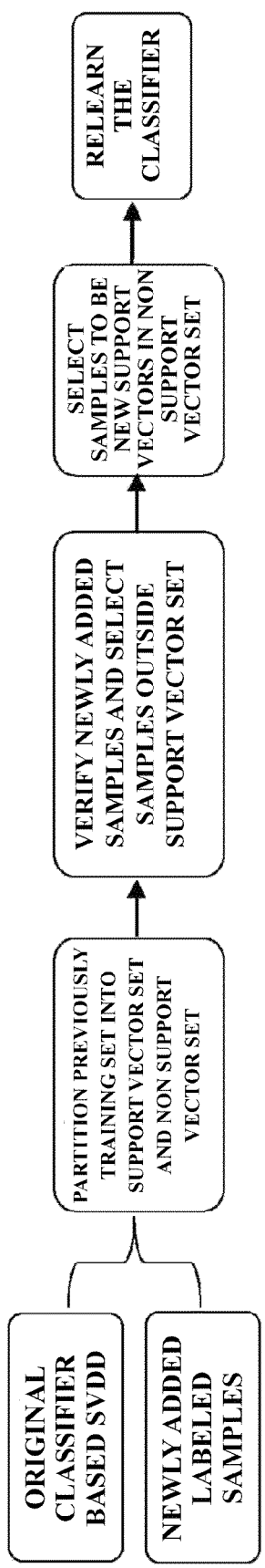
Figure 3B:
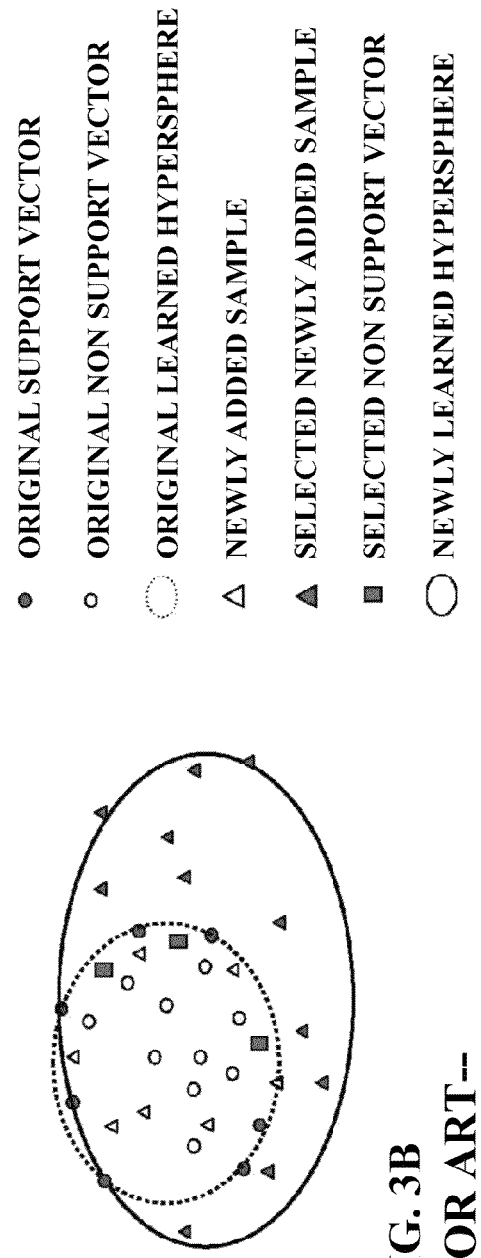
Figure 4:
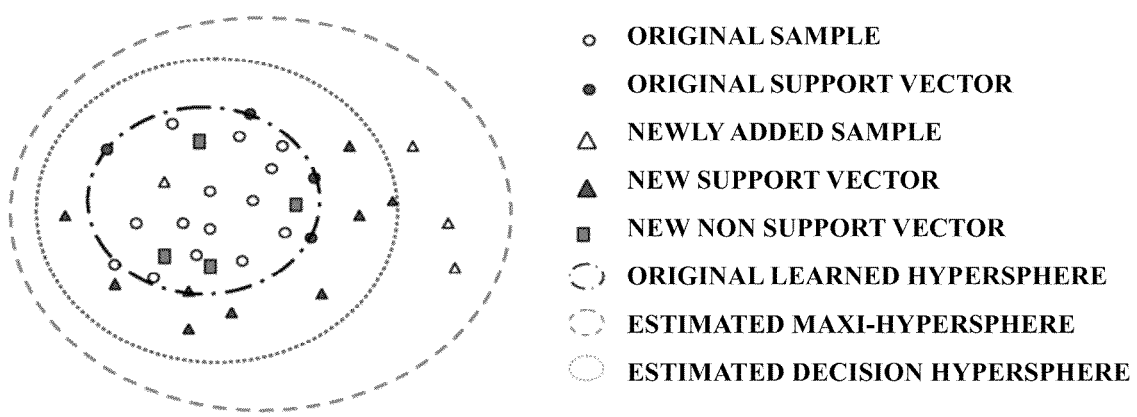
FIG. 4 shows a principle diagram of the method for learning of a classifier according to embodiments of the present invention.

FIG. 4 shows a principle diagram of the method for learning of a classifier according to embodiments of the present invention. As shown in FIG. 4, the inner circle (the minimum circle) shows the original hypersphere of the initial classifier for classifying. The original hypersphere is generated according to the original samples, and the boundary thereof is defined by the original support vectors. The support vectors and the non-support vectors can be distinguished by this original hypersphere. The outer circle (the maximum circle) in FIG. 4 is the maxi-hypersphere of the maximum possible space of all the samples. In the embodiment, it is desired to determine a decision hypersphere between the original hypersphere and the maxi-hypersphere, so that the probability of any positive samples falling within this decision hypersphere is stable. The size of the hypersphere can be changed by adjusting the probability of the positive samples falling within this decision hypersphere. With this decision hypersphere, whether the added unlabeled samples are positive or not can be determined.

As shown in FIG. 4, when newly added unlabeled samples fall between the Maxi-hypersphere and the decision hypersphere, the samples will not be determined as positive samples, and the previous classifier will be maintained. When newly added unlabeled sample fall inside the original hypersphere, the samples will be determined as positive samples, but they will not change the previous support vector set, and the previous classifier will still be maintained. When newly added unlabeled samples fall between the original hypersphere and the decision hypersphere, the samples will be determined as positive samples, and they will change the previous support vectors set.

In other words, in the method for learning of a classifier, the classifier is updated only with the samples which fall between the original hypersphere and the decision hypersphere. With the method according to the embodiment, the problem that the classifier's performance is unstable can be solved, and the fast calculation can be achieved. The performance of the learned classifier can be improved by adding unlabeled samples continually. With the present invention, it not only guarantees the learning accuracy but also reduces space and time complexities.

Figure 5:
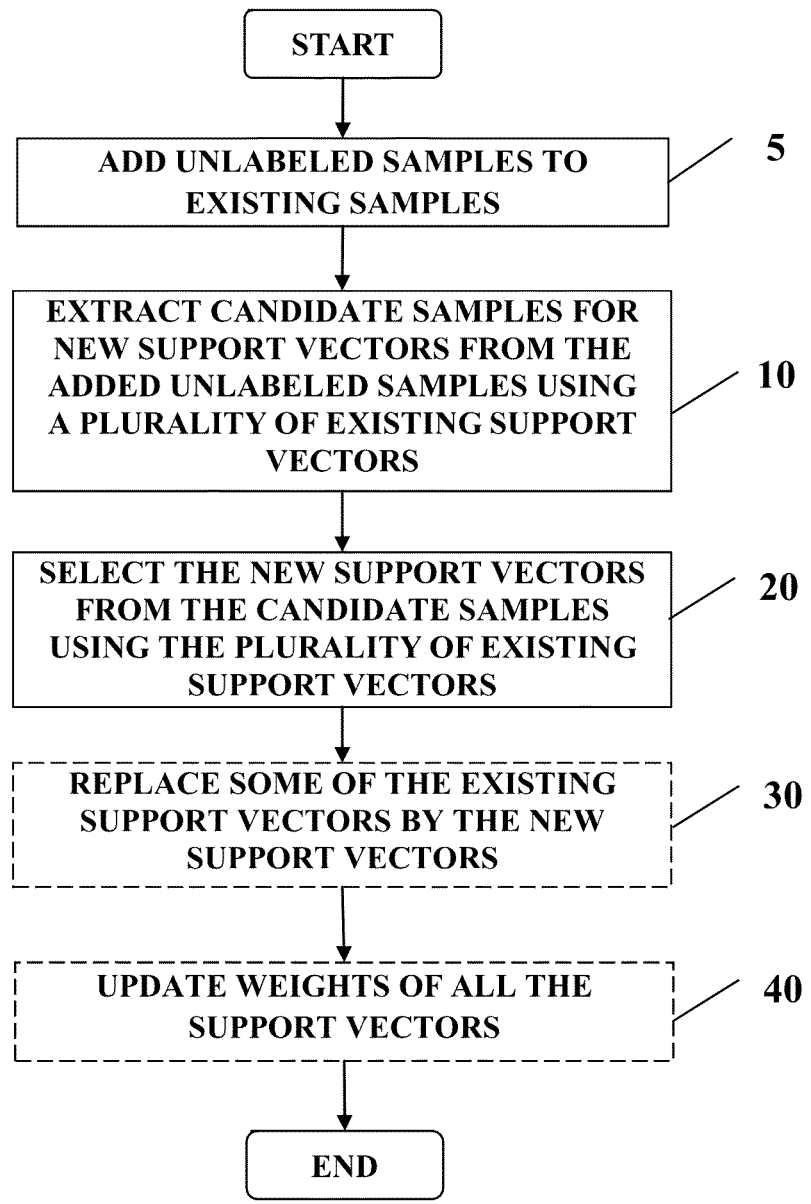
FIG. 5 shows an overall flowchart of the method for learning of a classifier according to embodiments of the present invention.

FIG. 5 shows an overall flowchart of the method for learning of a classifier according to embodiments of the present invention. As shown in FIG. 5, it is desired to relearn the original classifier with the newly added unlabeled samples to obtain a new classifier. First, at the step 5, some unlabeled samples are added to the existing samples.

At the step 10, candidate samples for new support vectors are extracted from the added unlabeled samples using a plurality of existing support vectors.

Figure 6:
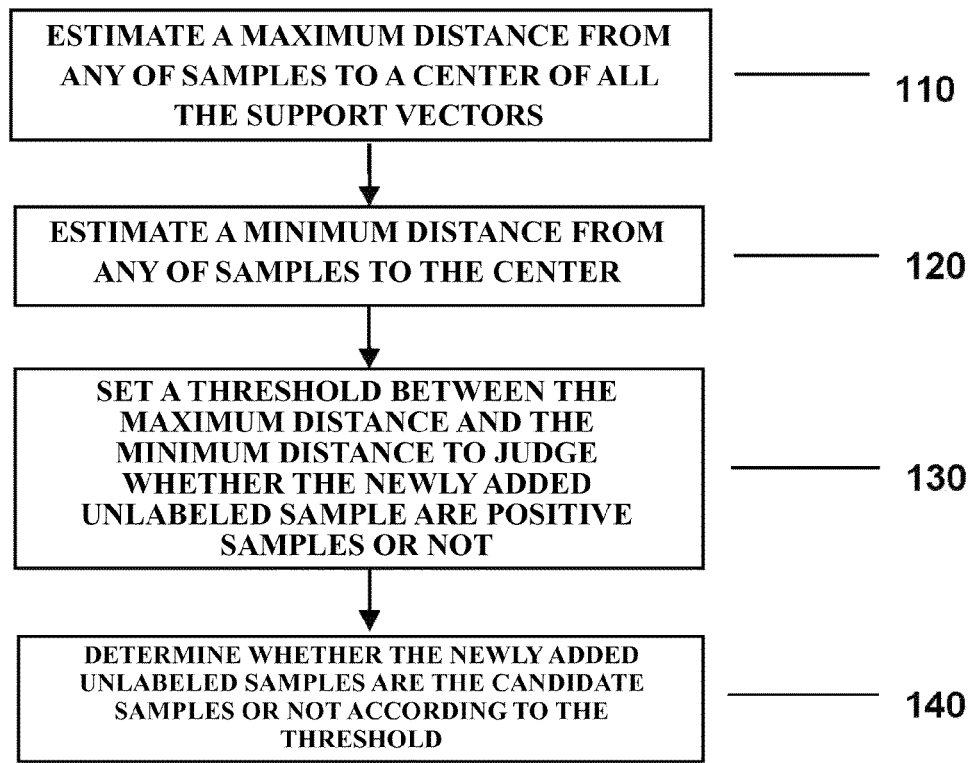
FIG. 6 shows a detailed flowchart of the process for extracting the candidate samples according to embodiments of the present invention.

FIG. 6 shows a detailed flowchart of the process for extracting the candidate samples according to embodiments of the present invention. First, at the step 110, a maximum distance from any of samples to a center of all the support vectors is estimated, that is, a possible maxi-hypersphere is generated according to the support vectors of the original classifier (support vectors in the feature space).

The possible maxi-hypersphere is generated using the above Support Vectors Date Description (SVDD) algorithm, that is, a maximum radius $R_{max}$ relative to the center of the hypersphere is determined. Most or all of the training samples are enclosed in this maxi-hypersphere. The maxi-hypersphere is constructed using the following equation (1):

$$\min R^2 + C\Sigma_i \xi_i \text{ subject to } \|x_i - a\|^2 \leq R^2 + \xi_i \text{ and } \xi_i \geq 0 \quad (1)$$

Wherein $x_i$ represents a support vector, C is a penalty factor, and $\xi_i$ is a slack error.

Applying Lagrangian multiplier to equation (1), a dual problem can be obtained as follows:

$$\min \Sigma_{i,j} \alpha_i \alpha_j K(x_i \cdot x_j) - \Sigma_i \alpha_i K(x_i \cdot x_i) \text{ subject to } 0 \leq \alpha_i \leq C \text{ and}$$
$$\Sigma_i \alpha_i = 1 \quad (2)$$

Wherein, $K(\bullet)$ is a kernel function with a non-negative function value. In this specification, the kernel function $K(\bullet)$ is selected as fixed for arbitrary normalized feature vector z in the feature space, that is, $K(z,z)$ is fixed.

In one embodiment, a Histogram intersection Kernel (HIK) function can be selected (e.g., see http://c2inet.sce.ntu.edu.sg/Jianxin/projects/libHIK/libHIK_v2.pdf):

$$K_{HI}(T, Q) = \sum_{i=1}^{N} \min(T_i, Q_i) \quad (3)$$

Wherein, T,Q are histograms of features, and N is the dimension of the histogram.

Note that although a description is given in this embodiment taking the HIK function of equation (3) as an example, those skilled in the art should appreciate that Hellinger's kernel functions and Jensen-Shannon kernel functions can also be selected.

Through the solution of the dual optimization problem of equation (2), a set of support vectors $x_i \in SVs$ and corresponding weights $\alpha_i$ can be obtained.

From the support vectors $x_i$ and weights $\alpha_i$ obtained through the above SVDD method, the radius $R_{max}$ of a possible maxi-hypersphere can be calculated. As to a given unlabeled sample, a normalized feature vector z can be generated therefrom, and the distance to the center of the hypersphere thereof can be calculated as follows:

$$f(z) = R_z^2 = K(z, z) - 2 \sum_{x_i \in SVs} \alpha_i K(x_i, z) + \sum_{x_i \in SVs} \sum_{x_j \in SVs} \alpha_i \alpha_j K(x_i, x_j) \quad (4)$$

If $f(z) = R_z^2 \leq R^2$, the feature vector z will falls in the interior of the hypersphere, and can be classified into a target object category. So, the square of the radium of the hypersphere, i.e., $R^2$, is defined as the threshold of the classifier.

According to equation (4), as to the feature vector z generated based on an unlabeled sample, the distance to the center of the hypersphere can be calculated. The distance is smaller or equal than the radius of the hypersphere, that is, $$f(z) = \quad (4a)$$
$$R_z^2 = K(z, z) - 2 \sum_{x_i \in SVs} a_i K(x_i, z) + \sum_{x_i \in SVs} \sum_{x_j \in SVs} a_i a_j K(x_i, x_j) \leq R^2$$

Here, we do not try to find the position of the center of the support vectors, and we just want to determine the distance function from the feature vector of any unlabeled sample to the center.

In order to solve the radius $R_{max}$ of the possible maxi-hypersphere, according to equation (4) above, we can obtain:

$$f_{max} = R_{max}^2 = \max(f(z)) = \quad (5)$$
$$K(z, z) - 2\min\left(\sum_{x_i \in SVs} a_i K(x_i, z)\right) + \sum_{x_i \in SVs} \sum_{x_j \in SVs} a_i a_j K(x_i, x_j)$$

As mentioned previously, for an arbitrary normalized feature vector z, $K(z,z)$ is fixed. Where a support vector $x_i \in SVs$ and a corresponding weight $\alpha_i$ are calculated according to equation (2), $$\sum_{x_i \in SVs} \sum_{x_j \in SVs} a_i a_j K(x_i, x_j)$$

has a fixed value. Thus, the key to solve $f_{max}$ is to obtain the minimum value of $$\sum_{x_i \in SVs} a_i K(x_i, z).$$

As described above, the kernel function $K(\cdot)$ is non-negative, thus $$\min\left(\sum_{x_i \in SVs} a_i K(x_i, z)\right) = 0.$$

Hence, equation (5) can be simplified as:

$$f_{max} = R_{max}^2 = K(z, z) + \sum_{x_i \in SVs} \sum_{x_j \in SVs} a_i a_j K(x_i, x_j) \quad (6)$$

Thus, the radius $R_{max}$ of a maxi-hypersphere is determined from equation (6) above. $K(z,z)$ will be fixed for any feature vector z, because $K(\cdot)$ is a HIK kernel and the vector z has been normalized.

$$\sum_{x_i \in SVs} \sum_{x_j \in SVs} \alpha_i \alpha_j K(x_i, x_j)$$

is fixed if the all support vectors are fixed. So $f_{max}$ is fixed for any feature vector z if all the support vectors are determined.

Next, referring to the step 120 of FIG. 6, a minimum distance from any of samples to the center is estimated, in other word, a possible minimum hypersphere is generated (a minimum distance $f_{max}$ is determined).

According to equation (4) above, the minimum distance $f_{min}$ can be expressed as follows:

$$\begin{aligned} f_{min} &= R_{min}^2 = \min(f(z)) \\ &= K(z, z) - 2\max\left(\sum_{x_i \in SVs} \alpha_i K(x_i, z)\right) + \sum_{x_i \in SVs} \sum_{x_j \in SVs} a_i a_j K(x_i, x_j) \\ &= f_{max} - 2\max\left(\sum_{x_i \in SVs} \alpha_i K(x_i, z)\right) \end{aligned} \quad (7)$$

As described above, under the condition that all support vectors have been determined, for an arbitrary normalized feature vector z, $f_{min}$ is fixed. Thus, solving $f_{min}$ can be transformed into solving the maximum of $$\sum_{x_i \in SVs} \alpha_i K(x_i, z).$$

It can be known from the definition of kernel function, $$\max\left(\sum_{x_i \in SVs} \alpha_i K(x_i, z)\right)$$

must be a specific value, but not be $+\infty$.

In this example, the HIK function is selected for description. In order to speed up the calculation, a lookup table lut is defined:

$$lut = \sum_{x_i \in SVs} \alpha_i K(x_i, z) = \sum_{j=1}^{N}\left(\sum_{i=1}^{M} \alpha_i \min(x_{ij}, z_j)\right) \leq \sum_{j=1}^{N}\sum_{i=1}^{M} \alpha_i x_{ij} \quad (8)$$

wherein, $x_{ij} \in X_i$, $X_i \in SVs$, M is the number of the support vectors and N is the dimension of the support vectors.

It can be learnt from equation (8) above, $$lut \leq \sum_{j=1}^{N}\sum_{i=1}^{M} \alpha_i x_{ij},$$

but max (lut) is not always equal to $$\sum_{j=1}^{N}\sum_{i=1}^{M} \alpha_i x_{ij},$$

as described in detail below. When max(lut) can take the form of $$\sum_{j=1}^{N}\sum_{i=1}^{M} \alpha_i x_{ij},$$

it means that only one feature vector is in the interior of the minimum hypersphere. In such a case, this feature vector can be determined as the center of the hypersphere, and it is determined that $$f_{min} = f_{max} - 2\sum_{j=1}^{N}\sum_{i=1}^{M} \alpha_i x_{ij}.$$

Figure 7:
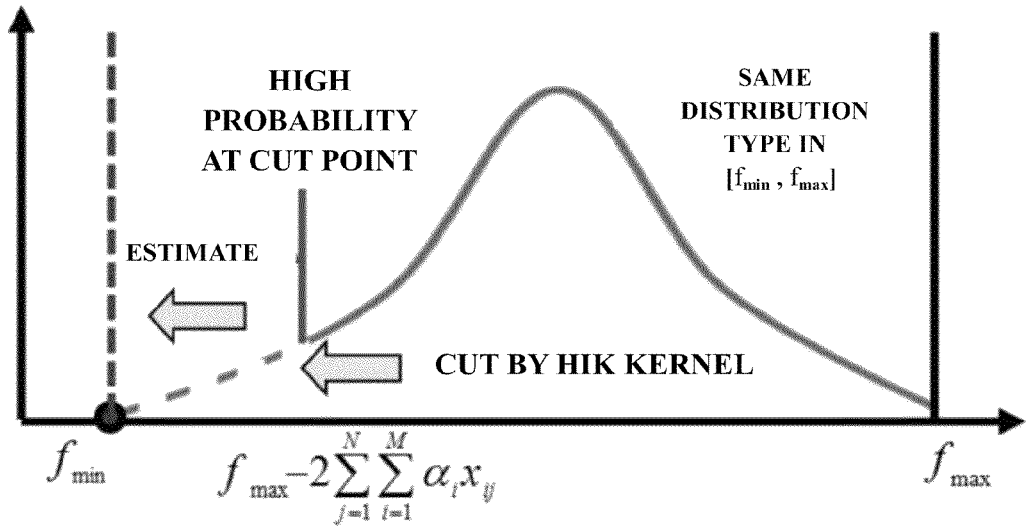
FIG. 7 shows a relationship diagram of $f_{min}$, $$f_{max} - 2\sum_{j=1}^{N}\sum_{i=1}^{M} \alpha_i x_{ij},$$

FIG. 7 shows a relationship diagram of $f_{min}$, $$f_{max} - 2\sum_{j=1}^{N}\sum_{i=1}^{M} \alpha_i x_{ij},$$

$f_{max}$ in calculating the distances from any samples to the center of the support vectors according to embodiments of the present invention. Referring to FIG. 7, in the case of feature vectors in the interior of the minimum hypersphere, instead of a sole one, $$f_{min} \neq f_{max} - 2\sum_{j=1}^{N}\sum_{i=1}^{M} \alpha_i x_{ij},$$

in which case, $f_{min}$ needs to be estimated, that is, max(lut) needs to be estimated.

In the example of the HIK kernel function, as to a jth dimension, it is defined as:

$$H_j = \Sigma_{i=1}^{M}\alpha_i \min(x_{ij}, z_j), j=1,2,3 \ldots N \quad (9)$$

The average value of $H_j$ is defined as $\bar{h}$, according to equation (8), lut=$N\bar{h}$. Thus, as to an N dimensional feature vector $z_j$, estimating the maximum of lut is equivalent to estimating the maximum value of the average values of lut on N dimensions, i.e., estimating max($\bar{h}$). Below, the range of $\bar{h}$ will be estimated using the sample estimation theory in the field of statistics.

According to the central limit theorem, $\bar{h}$ satisfies a normal distribution in the sample space. Thus, the probability $\Phi_z$ is a cumulative distribution, particularly as follows:

$$\Phi_z = \frac{\left(\sum_{j=1}^{N} H_j\right)/N}{\left(\sum_{j=1}^{N} \max(H_j)\right)/N} = \frac{\sum_{j=1}^{N}\sum_{i=1}^{M}\alpha_i \min(x_{ij}, z_j)}{\sum_{j=1}^{N}\sum_{i=1}^{M}\alpha_i x_{ij}} \quad (10)$$

According to the central limit theorem, $$\max(\text{lut})=N\max(\bar{H})=N(\mu+\lambda_z\sigma_e) \quad (11)$$

According to the standard error $\sigma_e = \sqrt{\Sigma_{j=1}^{N}(H_j^{max}-\mu)^2/N}$, $\mu = \Sigma_{j=1}^{N}H_j^{max}/N$ and the probability $\Phi_z$, $\lambda_z$ can be obtained from a look-up table of the standard normal cumulative distribution function, and the range of $\bar{h}$ is determined as $[\mu-\lambda_z\sigma_e, \mu+\lambda_z\sigma_e]$, after which max($\bar{h}$)=$\mu+\lambda_z\sigma_e$ is determined consequently.

Finally, through substituting the result of equation (11) into equation (7), the estimation of $f_{min}$ can be obtained.

Next, referring back to FIG. 6, at the step 130, a decision hypersphere is generated using $f_{min}$ calculated at the step 120 and $f_{max}$ calculated at the step 110.

FIG. 8 shows a principle diagram for setting the threshold according to embodiments of the present invention. Referring to FIG. 8, at the step 410, the area of the maxi-hypersphere is calculated:

$$\pi R_{max}^2 = \pi K(z, z) + \pi \sum_{x_i \in SVs}\sum_{x_j \in SVs} a_i a_j K(x_i, x_j) \quad (12)$$

f(z) has substantially the same type of distribution between [$f_{min}$, $f_{max}$]. Below, assuming a parameter P, i.e., a predetermined value representing the radio of the area of the decision hypersphere and the area of the maxi-hypersphere, through using $R_{min}$ calculated at step the 120 and $R_{max}$ calculated at the step 110, the radius $R_T$ of the decision hypersphere is generated. The parameter P is defined as follows:

$$P=(f_T(z)-f_{min})/(f_{max}-f_{min}) \quad (13)$$

According to equation (13), the radius $R_T$ of the decision hypersphere can be determined as:

$$f_T(z)=Pf_{max}+(1-P)f_{min}$$
$$\Rightarrow \pi R_T^2 = P\pi R_{max}^2+(1-P)\pi R_{min}^2$$
$$\Rightarrow R_T^2 = PR_{max}^2+(1-P)R_{min}^2 \quad (14)$$

According to equation (14), an appropriate threshold is estimated for a feature vector z, i.e., $f_T(z)$. Finally, $f_T$ is estimated for all support vectors $X_i \in SVs$:

$$f_T = \Sigma_{i=1}^{M}\alpha_i f_T(X_i) \quad (15)$$

$f_T$ is the threshold of the trained classifier. No matter how many and what training samples are available, the false positive rate of the classifier can be stably controlled below a level by the parameter P, that is, the probability of any positive feature vector falling in the generated decision hypersphere is fixed. That is, the performance of the classifier can be controlled by the parameter P.

Next, as shown in the step 140 of FIG. 6, whether the newly added unlabeled samples are the candidate samples or not is determined according to the threshold set in the step 130 of FIG. 6. As to a newly added unlabeled sample, a feature vector z can be extracted based on it. The distance from the feature vector z to the center of the support vectors of the existing classifier is calculated using the equation (4). Then, the distance is compared with the threshold set at the step 130 of FIG. 6.

If the distance from the feature vector z of the sample to the center is less than the threshold, the sample will be determined as a candidate sample; and if the distance from the feature vector z of the sample to the center is larger than the threshold, the sample will not be determined as a candidate sample.

Referring back to FIG. 5, at the step 20 of FIG. 5, the new support vectors are selected from the candidate samples using the plurality of existing support vectors. FIG. 9 shows a detailed flowchart of the process for selecting new support vectors according to embodiments of the present invention.

First, at the step 210, a bounding hypersphere is drawn according to the plurality of existing support vectors. As to a known classifier, an optimal solution a*=[$a_1$, $a_2$, ... $a_I$] makes every training support vector $x_i$ satisfy KKT (Karush-Kuhn-Tucker) conditions as follows:

$$\begin{cases} a_i = 0 \Rightarrow d_i^2 \leq R^2 \\ 0 < a_i < C \Rightarrow d_i^2 = R^2 \\ a_i = C \Rightarrow d_i^2 \geq R^2 \end{cases} \quad (16)$$

Where $d_i^2$ is the distance from $x_i$ to the center of the support vectors. So, the bounding hyper-sphere of the support vectors is a hyper-sphere with radius $R^2$. The KKT conditions are well known to those skilled in the art, and will not be discussed here in detail.

Next, at the step 220, whether the candidate samples are the new support vectors is determined according to the bounding hypersphere obtained at the step 210. According to the KKT conditions above, the candidate samples, i.e., the target training data can be classified into three categories:

1) The data points whose $a_i$=0 are inside of the sphere;
2) The data points whose 0<$a_i$<C are on the sphere boundary; and
3) The data points whose $a_i$=C fall outside the sphere and have nonzero $\xi_i$.

As shown in FIG. 4, the samples which fall inside the minimum hypersphere will not change the previous support vector set, and the previous classifier will still be maintained. The samples which fall between the maxi-hypersphere and the decision hypersphere in relation to the threshold will change the previous support vector set. Accordingly, if the candidate samples fall outside the bounding hyper sphere, the candidate samples will be selected as the new support vectors.

Referring back to FIG. 5, the method for learning of a classifier according to the present invention may comprise an optional step 30. In other words, the step 30 may be omitted. At the step 30 of FIG. 5, some of the existing support vectors are replaced by the new support vectors. FIG. 10 shows a detailed flowchart of the process for updating the support vectors according to embodiments of the present invention.

At the step 310 of FIG. 10, the distance from every support vector to the center of hypersphere is calculated according to equation (4). The result is $V=(d_1, d_2, \ldots d_n)$, where d is the distance and n is the number of support vectors.

At the step 320, the distances d in $V=(d_1, d_2, \ldots d_n)$ are reordered ascendingly, and $V'=(d_1', d_2', \ldots d_n')$ is obtained, where $d_1'$ is the nearest distance and $d_n'$ is the farthest distance. Then, the support vectors with the nearest distances are replaced by the new support vectors and a count of support vectors is kept constantly. For example, if there are three new support vectors, the three original support vectors with the nearest distances will be replaced. With the operations of FIG. 10, a set of new support vectors can be obtained.

Referring back to FIG. 5, the method for learning of a classifier according to embodiments of the present invention may comprise another optional step 40. In other words, the step 40 may be omitted. At the step 40 of FIG. 5, the weights of all the support vectors are updated. In John C. Platt, Sequential Minimal Optimization: A Fast Algorithm for Training Support Vector Machines. http://research.microsoft.com/pubs/69644/tr-98-14.pdf, it is disclosed a fast algorithm for training support vector machines, i.e., a Sequential Minimal Optimization (SMO) method. In Chih-Chung Chang and Chih-Jen Lin, LIBSVM: a library for support vector machines, 2001. Software available at http://csie.ntu.edu.tw/~cjlin/libsvm, it is disclosed a library for support vector machine. The SMO method breaks the large quadratic programming (QP) optimization problem into a series of smallest possible QP problems. These small QP problems are solved analytically, which avoids using a time-consuming numerical QP optimization as an inner loop. LIBSVM is a library for SVM, which is currently one of the most widely used SVM software. Both of the above references are hereby incorporated by reference herein in their entireties. The weights of all the support vectors of the classifier are updated by means of LIBSVM library using the SMO method, that is, the classifier is relearned.

FIG. 11 shows a functional block diagram of the device 1000 for learning of a classifier according to embodiments of the present invention. The functional blocks of the device 1000 may be implemented by hardware, software, or a combination of hardware and software to carry out the principles of the invention. It is understood by those skilled in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, according to one embodiment, a device 1000 for learning of a classifier may comprise an addition unit 1050, an extraction unit 1100 and a selection unit 1200. The addition unit 1050 adds unlabeled samples to existing samples. The extraction unit 1100 extracts candidate samples for new support vector from the added unlabeled samples using a plurality of existing support vectors. The selection unit 1200 selects the new support vectors from the candidate samples using the plurality of existing support vectors.

According to another embodiment, the device 1000 for learning of a classifier according to embodiments of the present invention may further comprise a support vectors replacement unit 1300. The support vectors replacement unit 1300 replaces some of the existing support vectors by the new support vectors.

According to another embodiment, the device 1000 for learning of a classifier according to embodiments of the present invention may further comprise a weights updating unit 1400. The weights updating unit 1400 updates weights of all the support vectors.

According to another embodiment, the extraction unit 1100 may further comprise a first estimating unit 1110, a second estimating unit 1120, a setting unit 1130 and a first determining unit 1140. The first estimating unit 1110 estimates a maximum distance from any of samples to a center of all the support vectors. The second estimating unit 1120 estimates a minimum distance from any of samples to the center. The setting unit 1130 sets a threshold between the maximum distance and the minimum distance to judge whether the newly added unlabeled samples are positive samples or not. The first determining unit 1140 determines whether the newly added unlabeled samples are the candidate samples or not according to the threshold.

Preferably, the threshold is set to make probability of any of positive samples falling within the threshold fixed.

According to another embodiment, the selection unit 1200 may further comprise a drawing unit 1210 and a second determining unit 1220. The drawing unit 1210 draws a bounding hypersphere according to the plurality of existing support vectors. The second determining unit 1220 determines whether the candidate samples are the new support vectors, wherein if a candidate sample is out of the bounding hypersphere, said candidate sample will be selected as a new support vector; and if a candidate sample is in the bounding hypersphere, said candidate sample will not be selected as a new support vector.

According to another embodiment, the support vectors replacement unit 1300 may further comprise a calculating unit 1310 and a replacing unit 1320. The calculating unit 1310 calculates distances from each of the support vectors to the center. The replacing unit 1320 replaces the support vectors with the nearest distances by the new support vectors and keeps a count of support vectors constantly.

Preferably, a Support Vector Data Description (SVDD) algorithm is used in the first estimating unit.

Preferably, a kernel function $K(\bullet)$ is used in the first and second estimating units, wherein the kernel function is chosen so that $K(z,z)$ is constant for any one of normalized vectors z.

Preferably, the kernel function $K(\bullet)$ includes Histogram Intersection Kernel (HIK).

FIG. 12 shows a functional block diagram of the processing apparatus 2000 according to embodiments of the present invention. The functional blocks of the processing apparatus 2000 may be implemented by hardware, software, or a combination of hardware and software to carry out the principles of the invention. It is understood by those skilled in the art that the functional blocks described in FIG. 12 may be combined or separated into sub-blocks to implement the principles of the invention as described above. Therefore, the description herein may support any possible combination or separation or further definition of the functional blocks described herein.

As shown in FIG. 12, according to one embodiment, the processing apparatus 2000 may comprise a classifier 2100, a receiving unit 2200, an extraction unit 1100, and a selection unit 1200. The classifier 2100 uses a plurality of existing support vectors. The receiving unit 2200 receives newly added unlabeled samples. The extraction unit 1100 extracts candidate samples for new support vectors from the added unlabeled samples using the plurality of existing support vectors. The selection unit 1200 selects the new support vectors from the candidate samples using the plurality of existing support vectors.

According to another embodiment, the processing apparatus 2000 may further comprise a support vectors replacement unit 1300. The support vectors replacement unit 1300 replaces some support vectors of the classifier by the new support vectors.

According to another embodiment, the processing apparatus 2000 may further comprise a weights updating unit 1400. The weights updating unit 1400 updates weights of all the support vectors of the classifier.

According to another embodiment, the extraction unit 1100 may further comprise a first estimating unit 1110, a second estimating unit 1120, a setting unit 1130 and a first determining unit 1140. The first estimating unit 1110 estimates a maximum distance from any of samples to a center of all the support vectors. The second estimating unit 1120 estimates a minimum distance from any of samples to the center. The setting unit 1130 sets a threshold between the maximum distance and the minimum distance to judge whether the newly added unlabeled samples are positive samples or not. The first determining unit 1140 determines whether the newly added unlabeled samples are the candidate samples or not according to the threshold.

Preferably, the threshold is set to make probability of any of positive samples falling within the threshold fixed.

According to another embodiment, the selection unit 1200 may further comprise a drawing unit 1210 and a second determining unit 1220. The drawing unit 1210 draws a bounding hypersphere according to the plurality of existing support vectors. The second determining unit 1220 determines whether the candidate samples are the new support vectors, wherein if a candidate sample is out of the bounding hypersphere, said candidate sample will be selected as a new support vector; and if a candidate sample is in the bounding hypersphere, said candidate sample will not be selected as a new support vector.

According to another embodiment, the support vectors replacement unit 1300 may further comprise a calculating unit 1310 and a replacing unit 1320. The calculating unit 1310 calculates distances from each of the support vectors to the center. The replacing unit 1320 replaces the support vectors with the nearest distances by the new support vectors and keeps a count of support vectors constantly.

Preferably, a Support Vector Data Description (SVDD) algorithm is used in the first estimating unit.

Preferably, a kernel function $K(\cdot)$ is used in the first and second estimating units, wherein the kernel function is chosen so that $K(z,z)$ is constant for any one of normalized vectors z.

Preferably, the kernel function $K(\cdot)$ includes Histogram Intersection Kernel (HIK).

FIG. 13 shows a flowchart of the user registered object detection method according to embodiments of the present invention. As shown in FIG. 13, at the step 3100, an object to be detected is received. For example, the object to be detected is an image or a video. At the step 3200, a classifier is invoked, the classifier comprising a plurality of existing support vectors which are generated according to the user registered object. At the step 3300, the object to be detected is recognized based on the classifier. The process of recognizing the object to be detected based on the classifier is known by those skilled in the art, and will not be discussed in detail here. At the step 3400, the classifier is updated using the method for learning of a classifier according to the principle of the present invention. As such, the updated classifier can be used to perform detection when a new object is inputted next time.

FIG. 14 shows a functional block diagram of the user registered object detection system according to embodiments of the present invention. In FIG. 14, the user registered object detection system 4000 comprises an object receiving unit 4100, an object recognizing unit 4200, and the device 1000 for learning of a classifier according to the principle of the present invention. The object receiving unit 4100 receives an object to be detected. For example, the object to be detected is an image or a video. The object recognizing unit 4200 recognizes the object to be detected based on a classifier, the classifier comprising a plurality of existing support vectors which are generated according to the user registered object. The process of recognizing the object to be detected based on the classifier is known by those skilled in the art, and will not be discussed in detail here. The device 1000 for learning of a classifier according to the principle of the present invention updates the classifier. As such, the updated classifier can be used to perform detection when a new object is inputted next time.

FIG. 15 shows a block diagram of the hardware configuration of the computer system 5000 according to embodiments of the present invention.

As shown in FIG. 15, the computer system comprises a computer 5110. The computer 5110 comprises a processing unit 5120, a system memory 5130, non-removable non-volatile memory interface 5140, removable non-volatile memory interface 5150, user input interface 5160, network interface 5170, video interface 5190 and output peripheral interface 5195, which are connected via a system bus 5121.

The system memory 5130 comprises ROM (read-only memory) 5131 and RAM (random access memory) 5132. A BIOS (basic input output system) 5133 resides in the ROM 5131. An operating system 5134, application programs 5135, other program modules 5136 and some program data 5137 reside in the RAM 5132.

A non-removable non-volatile memory 5141, such as a hard disk, is connected to the non-removable non-volatile memory interface 5140. The non-removable non-volatile memory 5141 can store an operating system 5144, application programs 5145, other program modules 5146 and some program data 5147, for example.

Removable non-volatile memories, such as a floppy drive 5151 and a CD-ROM drive 5155, are connected to the removable non-volatile memory interface 5150. For example, a floppy disk 5152 can be inserted into the floppy drive 5151, and a CD (compact disk) 5156 can be inserted into the CD-ROM drive 5155.

Input devices, such a microphone 5161 and a keyboard 5162, are connected to the user input interface 5160.

The computer 5110 can be connected to a remote computer 5180 by the network interface 5170. For example, the network interface 5170 can be connected to the remote computer 5180 via a local area network 5171. Alternatively, the network interface 5170 can be connected to a modem (modulator-demodulator) 5172, and the modem 5172 is connected to the remote computer 5180 via a wide area network 5173.

The remote computer 5180 may comprise a memory 5181, such as a hard disk, which stores remote application programs 5185.

The video interface 5190 is connected to a monitor 5191.

The output peripheral interface 5195 is connected to a printer 5196 and speakers 5197.

The computer system shown in FIG. 15 is merely illustrative and is in no way intended to limit the invention, its application, or uses.

The computer system shown in FIG. 15 may be implemented to any of the embodiments, either as a stand-alone computer, or as a processing system in an apparatus, possibly with one or more unnecessary components removed or with one or more additional components added.

The examples of test comparison of the method for learning of a classifier according to the principle of the present invention and other methods in prior art are illustrated. Note that, the examples illustrated here are only illustrative for showing the advantageous technical effects of the present invention, and not for limiting.

The method for learning of a classifier according to the present invention is used in the User Registered Object Detection (UROD) system. One-shot sample of a specified object is given by a user. A classifier based on SVDD is obtained from the given sample to detect the user registered object. A window is set on the image (possibly at multiple scales), and slid across the image to classify each such local window as containing the target or background. Then, the classifier is updated using the detected object. The features for image regional description are color and Local ternary pattern (LTP). Then the next frame is detected by the updated detector.

Table 1 shows the hardware and software configurations in the tests.

TABLE 1

| Software | OS | Win-XP professional, 2002 Version, service pack 2 |
|---|---|---|
|  | Coding Language | C++ |
|  | Compiler Vision | VC++ 2005 |
| Hardware | CPU | Intel Core(TM)2 Quad CPU, 2.40 GHz |
|  | Memory | 2.00 GB |

Evaluation Example 1

Eight videos are selected randomly, which include different kinds of animals. These videos are all shot by hand-held camera. Many frames in these videos are blurring for out-focus or motion, and the changes of view points and distortions of the target are very large. In addition, the illumination also changes frequently. In evaluation, PASCAL criterion is selected as the evaluation criterion. In M. Everingham, A. Zisserman, C. K. I. Williams, and L. Gool, "The PASCAL Visual Object Classes Challenge 2006 (VOC2006) Results," http://www.pascal-network.org/challenges/VOC/voc2006/results.pdf, the PASCAL criterion is described. The above reference is hereby incorporated by reference herein in its entirety. When (labeling region ∩ detected region)/(labeling region ∪ detected region)>T, the detected region is regarded as a correct detected region, that is, the detected region is a positive sample. In this example, T is set to 0.5. The method according to embodiments of the present invention is compared with the Online SVDD method and the Incremental SVDD method. The comparison results are shown in table 2.

TABLE 2

| UROD system | Total frames | Target in frames | Recall rate (detection) | Reject rate (false alarm) | Speed (fps) |
|---|---|---|---|---|---|
| Online SVDD | 8827 | 4741 | 0.65 | 0.125 | 3.67 |
| Incremental SVDD | 8827 | 4741 | 0.90 | 0.109 | 2.52 |
| Present invention | 8827 | 4741 | 0.90 | 0.005 | 3.02 |

As shown in Table 2, when the method for learning of a classifier according to the present invention is used for object detection, it can reduces the reject rate largely over the Online SVDD method and the Incremental SVDD method, and the detection rate of our method is higher than the Online SVDD method and comparable to the incremental SVDD learning. In addition, the learning speed of the method for learning of a classifier according to the present invention is also faster than that of the Online SVDD method.

Evaluation Example 2

3 video sequences with one object in each are selected for evaluation tests. For the video of each object, only one sample is provided, with which a total of 50 samples are simulated using perspective transformation. These samples are used for training. The detection tests are performed with the use of the method according to the present invention, the Online SVDD method and the Incremental SVDD method. After detecting object in each frame, the detection rate and FPPI (False Positive Per Image) for all of detected frames are computed.

FIGS. 16A, 16B, and 16C show comparison graphs of the detection rate and the FPPI for three videos with regard to the method according to the present invention, the Online SVDD method and the Incremental SVDD method. In FIGS. 16A, 16B, and 16C, the reference numerals 1, 2 and 3 indicate the method according to the present invention, the Online SVDD method and the Incremental SVDD method, respectively.

As shown in FIGS. 16A, 16B, and 16C, when new samples are added continually, the detection rate can be kept at a high level, and the FPPI can be kept at a low level stably at the same time with the method for learning of a classifier according to the present invention. The FPPI cannot be kept at a low level with the Online SVDD method and the Incremental SVDD method.

Evaluation Example 3

Next, the application of the method according to the present invention in the field of object tracking is studied.

In S. Stalder, H. Grabner, and L. Van Gool. Beyond semi-supervised tracking. ICCV Workshop, 2009, a beyond semi-boost method is described. In A. Saffari, etc. On-line random forests. In Proc. On-line Learning for Computer Vision Workshop, 2009, an online Random Forest method is described. In B. Babenko, M. H. Yang and S. Belongie. Visual Tracking with Online Multiple Instance Learning. In CVPR, 2009, an online Multi-Instance Learning method is described. The above three methods are used in object tracking in the art. In evaluation example 3, the method according to the present invention is compared with the above three methods.

Ten videos including different kinds of animals are selected. These videos are all shot by hand-held camera. These videos are difficult for tracking, because many frames in these videos are blurring for out-focus or motion, and the changes of view points and distortions are very many and are occurred rapidly.

We point out the size and position of object in the first frame for the method according to the present invention and the above three tracking method, and cut said image region about object as a teacher sample for the present invention.

FIG. 17 shows a graph of the average error rate in the tracking application with regard to the method according to the present invention and other three methods in prior art. The average error rate is the percent of cumulative error frames number in the total frames number. FIGS. 18A, 18B, 18C and 18D show the illustrative results in the tracking application with regard to the method according to the present invention and other three methods in prior art. The squares in FIGS. 18A, 18B, 18C, and 18D are the derived tracked objects in that frame. In FIGS. 17 and 18A, 18B, 18C, and 18D, the reference numerals 1, 2, 3 and 4 indicate the results of the method according to the present invention, the beyond semi-boost method, the online Random Forest method and the online Multi-Instance Learning method, respectively.

As shown in FIGS. 17 and 18A, 18B, 18C, and 18D, the method according to the present invention can get better performance than the other online tracking methods. It can solve the drifting problem in the tracking.

Table 3 shows the comparison on computation time between the method according to the present invention and the above three methods.

TABLE 3

| method | initialization | updating | Detect or track |
|---|---|---|---|
| Present invention | 0.15 s | 0.1 s | 0.2 s/frame |
| Semi-boost | 2 s | 0.3 s | 0.06 s/frame |
| Online RF | 0.03 s | 0.2 s | 0.2 s/frame |
| Online MIL | 0.35 s | 0.2 s | 0.15 s/frame |

As shown in Table. 3, the speed for detecting, learning and updating with the method according to the present invention is fast enough for online usages.

It is possible to carry out the method and system of the present invention in many ways. For example, it is possible to carry out the method and system of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

This application claims the benefit of Patent Application filed in the People's Republic of China, Application No. 201210049537.8, Serial No. 2012030100266410, filed Feb. 29, 2012, which is hereby incorporated by reference herein in its entirety.

What is claimed is:

1. A method for learning of a classifier using a plurality of samples, the method comprising:
    adding unlabeled samples to existing samples;
    estimating a maximum distance from any of samples to a center of all support vectors;
    estimating a minimum distance from any of samples to the center;
    setting a threshold between the maximum distance and the minimum distance to judge whether the newly added unlabeled sample are positive samples or not;
    determining whether the newly added unlabeled samples are candidate samples for new support vectors or not according to the threshold;
    extracting the candidate samples for new support vectors from the added unlabeled samples; and
    selecting the new support vectors from the candidate samples using a plurality of existing support vectors.

2. The method according to claim 1, further comprising replacing some of the existing support vectors by the new support vectors.

3. The method according to claim 2, wherein replacing some of the existing support vectors comprises:
    calculating distances from each of the support vectors to the center; and
    replacing the support vectors with the nearest distances by the new support vectors and keeping a count of support vectors constantly.

4. The method according to claim 1, further comprising updating weights of all the support vectors.

5. The method according to claim 1, wherein the threshold is set to make probability of any of positive samples falling within the threshold fixed.

6. The method according to claim 1, wherein a Support Vector Data Description (SVDD) algorithm is used in estimating the maximum distance.

7. The method according to claim 1, wherein a kernel function K(•) is used in estimating the maximum distance and the minimum distance, wherein the kernel function is chosen so that K(z,z) is constant for any one of normalized vectors z.

8. The method according to claim 7, wherein the kernel function K(•) includes Histogram Intersection Kernel (HIK).

9. The method according to claim 1, wherein selecting the new support vectors comprises:
    drawing a bounding hypersphere according to the plurality of existing support vectors; and
    determining whether the candidate samples are the new support vectors,
    wherein if a candidate sample is out of the bounding hypersphere, the candidate sample will be selected as a new support vector; and if a candidate sample is in the bounding hypersphere, the candidate sample will not be selected as a new support vector.

10. A device for learning of a classifier using a plurality of samples, the device comprising:
    an addition unit for adding unlabeled samples to existing samples;
    an estimating unit for estimating a maximum distance from any of samples to a center of all support vectors;
    an estimating unit for estimating a minimum distance from any of samples to the center;
    a threshold setting unit for setting a threshold between the maximum distance and the minimum distance to judge whether the newly added unlabeled sample are positive samples or not;

a determination unit for determining whether the newly added unlabeled samples are candidate samples for new support vectors or not according to the threshold;

an extraction unit for extracting candidate samples for new support vectors from the added unlabeled samples; and a selection unit for selecting the new support vectors from the candidate samples using a plurality of existing support vectors.

11. A user registered object detection method, comprising:

receiving an object to be detected;

invoking a classifier, the classifier comprising a plurality of existing support vectors which are generated according to the user registered object;

recognizing the object to be detected based on the classifier; and updating the classifier using the method according to claim 1.

12. The method according to claim 11, wherein the object to be detected is an image or a video.

13. A user registered object detection system, comprising:

an object receiving unit for receiving an object to be detected;

an object recognizing unit for recognizing the object to be detected based on a classifier, the classifier comprising a plurality of existing support vectors which are generated according to the user registered object;

a device for learning of a classifier according to claim 10 for updating the classifier.

14. A non-transitory computer readable storage medium storing a program that causes a computer to function as each unit of a device of claim 10.

* * * * *